United States Patent
Kawasaki

(10) Patent No.: US 7,087,195 B2
(45) Date of Patent: Aug. 8, 2006

(54) PHOTOCHROMIC CURABLE COMPOSITION AND CURED ARTICLES THEREOF

(75) Inventor: Takayoshi Kawasaki, Machida (JP)

(73) Assignee: Tokuyama Corporation, Yamaguchi (JP)

(*) Notice: Subject to any disclaimer, the term of this patent is extended or adjusted under 35 U.S.C. 154(b) by 265 days.

(21) Appl. No.: 10/450,134

(22) PCT Filed: Nov. 28, 2001

(86) PCT No.: PCT/JP01/10390

§ 371 (c)(1),
(2), (4) Date: Jun. 12, 2003

(87) PCT Pub. No.: WO02/48220

PCT Pub. Date: Jun. 20, 2002

(65) Prior Publication Data

US 2004/0046156 A1 Mar. 11, 2004

(30) Foreign Application Priority Data

Dec. 13, 2000 (JP) .............................. 2000-379368

(51) Int. Cl.
*G02B 5/23* (2006.01)
*G02B 5/02* (2006.01)
*F21V 9/00* (2006.01)
*C08F 2/00* (2006.01)

(52) U.S. Cl. ....................... 252/586; 252/582; 526/204

(58) Field of Classification Search ................. 252/586
See application file for complete search history.

(56) References Cited

U.S. PATENT DOCUMENTS

| 5,739,243 A | 4/1998 | Herold et al. |
| 5,776,376 A * | 7/1998 | Nagoh et al. ................ 252/586 |
| 6,733,700 B1 * | 5/2004 | Houston et al. ............. 264/1.1 |

FOREIGN PATENT DOCUMENTS

| EP | 0331217 A1 * | 1/1989 |
| EP | 0 519 410 A2 | 12/1992 |
| EP | 1130038 A1 * | 9/2001 |
| JP | 01163287 A * | 6/1989 |
| JP | 1163287 A1 * | 6/1989 |
| JP | 4-202308 A | 7/1992 |
| JP | 5-105730 A | 4/1993 |
| JP | 05105730 A * | 4/1993 |

OTHER PUBLICATIONS

C.B. McArdle; Applied Photochromic Polymer Systems, p. 50 and 63-69.

* cited by examiner

*Primary Examiner*—Randy Gulakowski
*Assistant Examiner*—Timothy J. Kugel
(74) *Attorney, Agent, or Firm*—Birch, Stewart, Kolash & Birch, LLP

(57) ABSTRACT

There is provided a method of preventing decreases in the developed color density and color fading speed of an organic photochromic compound without lowering the mechanical and optical physical properties such as hardness of a cured product when the cured product which has the organic photochromic compound dispersed in a polymer matrix is obtained. A photochromic cured product is obtained by curing a photochromic curable composition which comprises a polymerizable monomer having a biphenyl skeleton such as p-phenylphenyl methacrylate, a multifunctional polymerizable monomer having no biphenyl skeleton such as a mixture of trimethylolpropane trimethacrylate and triethylene glycol dimethacrylate, and an organic photochromic compound.

9 Claims, No Drawings

PHOTOCHROMIC CURABLE COMPOSITION AND CURED ARTICLES THEREOF

This application is the national phase under 35 U.S.C. § 371 of PCT International Application No. PCT/JP01/10390 which has an International filing date of Nov. 28, 2001, which designated the United States of America.

1. Technical Field

The present invention relates to a photochromic cured product having high photochromic properties and excellent mechanical properties and to a curable composition for providing the cured product.

2. Background Art

An organic photochromic compound which can cause isomerization by absorption of light so as to change optical properties such as an absorption band has been actually used as a functional element of an organic photochromic lens. Photochromic lenses are lenses which can be used as sun glasses under conditions such as the outside where an ultraviolet radiation is strong, by absorbing an ultraviolet radiation so as to acquire or develop a color having absorption in a visible range and thereby reduce light transmittance, and becomes colorless or returns to a lighter color under conditions such as the inside where an ultraviolet radiation is weak. Thus, it is an important function as the photochromic lens to improve photochromic properties such as a color development speed and a developed color density when the lens is moved from the inside to the outside and fading when the lens is moved back to the inside from the outside. In general, it is known that when an organic photochromic compound which shows excellent photochromic properties such as a developed color density, a color development speed and a color fading speed in free space, e.g., in a solution, is dispersed in a polymer matrix such as plastic materials, the compound cannot fully exhibit the intrinsic photochromic properties, and the developed color density and the color fading speed in particular deteriorate. Thus, it is very important to enable the organic photochromic compound to exhibit its intrinsic properties in the polymer matrix, in order for the organic photochromic compound to function as a photochromic lens.

As a method for improving the color development speed, color fading speed and developed color density of the organic photochromic compound in the polymer matrix, a method is conceivable which comprises improving physicochemical properties of a molecular environment in which the organic photochromic compound exists, i.e., a plastic substrate and thereby exploiting the intrinsic functions of photochromic pigments effectively. In such a method, it is necessary to increase the degree of spatial freedom of the molecular environment in which the photochromic compound exists, so as to facilitate isomerization or a change in configuration of a molecule by light absorption which is a principle of color development of the photochromic compound, and to provide the molecular environment with sufficient thermal molecular mobility or increase free space therein within a temperature range used, it is considered effective to reduce a crosslink density or copolymerize with a monomer having a low glass transition temperature or a high-molecular-weight monomer so as to soften a thermosetting resin which serves as the polymer matrix. However, when the plastic molded article (polymer matrix) is softened unnecessarily, the hardness of the substrate itself is degraded, and abrasion resistance and impact resistance thereof are also lowered. Thus, mechanical properties are degraded, so that the plastic molded article cannot be used as a plastic molded article for glass lenses.

In the specification of U.S. Pat. No. 5,739,243, a method of producing a photochromic lens by a combination of a long-chain alkylene glycol dimethacrylate having a high molecular weight and a multifunctional monomer is disclosed. In this method, despite improvements in color development speed and color fading speed, there arise new problems that the mechanical properties of a plastic molded article which is a substrate are degraded and that optical distortion also occurs. Further, it has been confirmed that the mechanical properties are degraded particularly in a high temperature range and the molded article has a problem with respect to heat resistance. Further, when a monomer having a long chain alkylene glycol group is used, the refractive index of the plastic molded article deteriorates which is very disadvantageous as a plastic substrate for glass lenses.

The present inventors have made intensive studies and completed the present invention based on a fundamental belief that it is effective for improvements of photochromic properties such as a developed color density, a color development speed and a color fading speed to incorporate a functional group which increases micro mobility and increases a chance of occurrence of alleviation of thermal molecular motion into the plastic molded article forming the molecular environment surrounding the photochromic compound so as to increases a chance of occurrence of photochemical and thermal changes in configuration which are a principle of color development and color fading of the photochromic compound and to dissociate associated molecules in a photochromic compound which may be present without molecules dispersed caused by any association in a conventional organic photochromic lens and disperse the molecules so as to cause each of the molecules to function effectively.

DISCLOSURE OF THE INVENTION

Therefore, an object of the present invention is to provide a curable composition capable of providing a photochromic plastic cured product having excellent photochromic properties such as a high developed color density, a high color development speed and a high color fading speed without lowering the hardness and refractive index of the plastic molded article.

Another object of the present invention is to provide a photochromic curable composition capable of providing a cured product which shows excellent photochromic properties such as a high developed color density, a high color development speed and a high color fading speed and may have physical properties such as hardness and a refractive index which are satisfactory as an optical plastic material.

Still another object of the present invention is to provide a cured product of the above photochromic curable composition of the present invention.

Other objects and advantages of the present invention will be apparent from the following description.

According to the present invention, firstly, the above objects and advantages of the present invention are achieved by a photochromic curable composition comprising a polymerizable monomer having a biphenyl skeleton, a multifunctional polymerizable monomer having no biphenyl skeleton, and an organic photochromic compound.

According to the present invention, secondly, the above objects and advantages of the present invention are achieved by a photochromic cured product obtained by curing the composition of the present invention.

Although the present invention is not restricted by a theory, the reason why excellent photochromic properties typified by an improvement in the color fading speed of the organic photochromic compound in the cured product of the present invention are obtained is assumed to be because molecules are liable to cause a change in configuration in a molecular theoretically micro range and molecules in the photochromic compound are dispersed without association.

BEST MODE FOR CARRYING OUT THE INVENTION

A polymerizable monomer (also referred to as "biphenyl monomer") having a biphenyl skeleton which is used in the present invention is not particularly limited as long as it is a compound which has at least one group having a biphenyl skeleton such as a biphenylyl group, a biphenylylene group or a biphenyldiyl group and at least one polymerizable group in a molecule. The polymerizable group refers to a functional group showing polymerizability and is suitably a radical polymerizable group from the viewpoint of ease of curing. Illustrative examples of the radical polymerizable group include an acryloyl group, an acryloyloxy group, a methacryloyl group, a methacryloyloxy group, and a vinyl group. Of these, the acryloyloxy group and the methacryloyloxy group are particularly suitably used. In the present invention, from the viewpoints of high color development and color fading speeds of a photochromic compound in a cured product, as the biphenyl monomer, a polymerizable monomer in which one or two groups selected from the group consisting of, for example, an acryloyloxy group, a methacryloyloxy group, an acryloyloxyalkyloxy group and a methacryloyloxyalkyloxy group is/are directly bonded to the biphenyl skeleton is suitably used.

In particular, illustrative examples of biphenyl monomers which can be suitably used include those represented by the following formulae (1), (2) and (3):

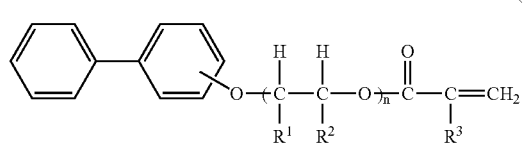

(wherein $R^1$, $R^2$ and $R^3$ are each independently a hydrogen atom or a methyl group, and n is an integer of 0 to 3),

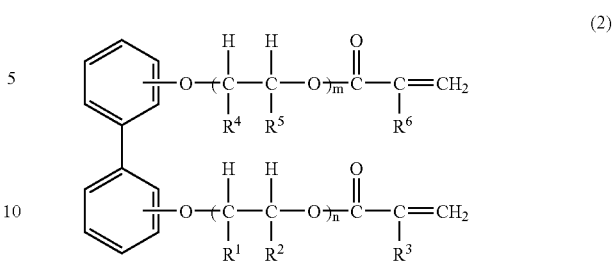

(wherein $R^1$, $R^2$, $R^3$, $R^4$, $R^5$ and $R^6$ are each independently a hydrogen atom or a methyl group, and n and m are each independently an integer of 0 to 3),

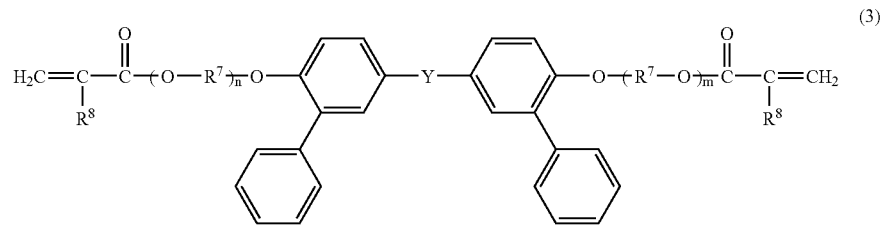

(wherein $R^7$ represents an ethylene group or a propylene group, $R^8$ represents a hydrogen atom or a methyl group, m+n is an integer of 0 to 8, and Y represents any one of the following divalent groups).

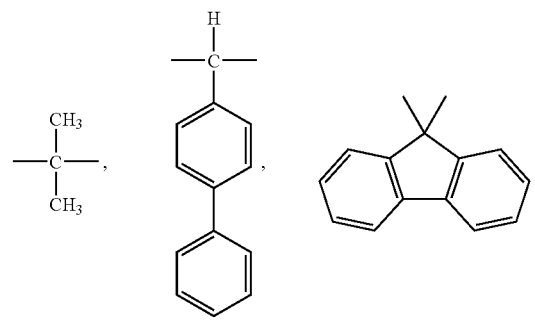

These biphenyl monomers can be used alone or in admixture of two or more.

The biphenyl monomers represented by the above formulae (1), (2) and (3) can be synthesized by the following method, for example.

A monomer in which an acryloyloxy group or a methacryloyloxy group is directly bonded to a biphenyl group can be synthesized by reacting a biphenol having a hydroxyl group introduced into a site where a polymerizable group is to be introduced with (meth)acrylic anhydride or (meth) acrylic chloride under alkaline and anhydrous conditions. Further, a monomer in which an acryloyloxyalkyloxy group or a methacryloyloxyalkyloxy group is directly bonded to a biphenyl group can be synthesized by reacting a corresponding biphenol with alpha-halogeno-omega-alkenol under alkaline conditions so as to synthesize hydroxyalkyloxybiphenyl which is an intermediate and then introducing a polymerizable group by the above method.

The content of the biphenyl monomer in a photochromic curable composition of the present invention is not particularly limited. The biphenyl monomer is used in an amount of preferably 2 to 80 parts by weight, more preferably 2 to 50 parts by weight, based on 100 parts by weight of the total of the biphenyl monomer and a multifunctional polymerizable monomer having no biphenyl skeleton to be described later. Further, the amount of the biphenyl monomer is suitably 2 to 30% by weight, particularly suitably 5 to 20% by weight, based on the total weight of all monomers (including, if present, a monomer to be described later which is an arbitrary component) contained in the photochromic curable composition from the viewpoint of the mechanical properties of the polymer.

The photochromic curable composition of the present invention needs to contain a multifunctional polymerizable monomer (hereinafter also referred to as "multifunctional monomer") having no biphenyl skeleton, in addition to the above biphenyl monomer. When only the biphenyl monomer or only a combination of the biphenyl monomer and a monofunctional monomer having no biphenyl skeleton is used, polymerization is difficult or it is difficult to obtain a cured product having sufficient hardness even if polymerization is possible. The multifunctional monomer refers to a monomer having a plurality of polymerizable groups in a molecule.

The multifunctional monomer to be used in the present invention is not particularly limited. However, from the viewpoint of the hardness of a cured product to be obtained, the multifunctional monomer is suitably a mixture of a bifunctional polymerizable monomer (hereinafter also referred to as "bifunctional monomer") having no biphenyl skeleton and a polymerizable monomer (monomer having at least three functional groups) having no biphenyl skeleton and at least three functional groups.

Suitable examples of the bifunctional monomer include dimethacrylate derivatives, diacrylate derivatives, divinyl derivatives, diallyl derivatives, and distyryl derivatives. More preferably, the dimethacrylate derivatives are used. Specific examples of bifunctional monomers which can be suitably used from the viewpoint of optical and physical properties include diacrylates and dimethacrylates such as ethylene glycol diacrylate, diethylene glycol dimethacrylate, triethylene glycol dimethacrylate, tetraethylene glycol dimethacrylate, ethylene glycol bisglycidyl methacrylate, bisphenol A dimethacrylate, 2,2-bis(4-methacryloyloxyethoxyphenyl)propane, and 2,2-bis(3,5-dibromo-4-methacryloyloxyethoxyphenyl)propane; diallyl compounds such as diallyl phthalate, diallyl terephthalate, diallyl isophthalate, diallyl tartrate, diallyl epoxysuccinate, diallyl fumarate, diallyl clorendate, diallyl hexaphthalate, diallyl carbonate, allyl diglycol carbonate, and trimethylolpropane triallyl carbonate; dithioacrylates and dithiomethacrylates such as 1,2-bis(methacryloylthio)ethane, bis(2-acryloylthioethyl)ether, and 1,4-bis(methacryloylthiomethyl)benzene; and divinyl compounds such as divinylbenzene. These bifunctional monomers can be used alone or in combination of two or more.

As for the polymerizable monomer (monomer having at least three functional groups) having no biphenyl skeleton and at least three functional groups, a monomer having 3 to 6 functional groups is suitably used as one which is easy to use from an industrial standpoint. Specific examples of such monomers which can be suitably used include trimethacrylate derivatives, triacrylate derivatives, trivinyl derivatives, tetramethacrylate derivatives, tetraacrylate derivatives, tetravinyl derivatives, pentamethacrylate derivatives, pentaacrylate derivatives, pentavinyl derivatives, hexamethacrylate derivatives, hexaacrylate derivatives, and hexavinyl derivatives. As specific compounds belonging to these monomers, those having a methacryloyloxy group or acryloyloxy group as a polymerizable group such as trimethylolpropane trimethacrylate, trimethylolpropane triacrylate, tetramethylolmethane trimethacrylate, tetramethylolmethane triacrylate, trimethylolpropane triethylene glycol trimethacrylate, trimethylolpropane triethylene glycol triacrylate, pentaerythritol trimethacrylate, pentaerythritol triacrylate, ethoxylated pentaerythritol tetramethacrylate and ethoxylated pentaerythritol tetraacrylate are particularly preferred. These multifunctional monomers can be used alone or in admixture of two or more.

The content of the multifunctional monomer in the photochromic curable composition of the present invention is not particularly limited. The multifunctional monomer is used in an amount of preferably 20 to 98 parts by weight, more preferably 50 to 98 parts by weight, based on 100 parts by weight of the total of the multifunctional monomer and the polymerizable monomer having a biphenyl skeleton. Further, the amount of the multifunctional monomer is suitably 70 to 95% by weight, particularly suitably 80 to 90% by weight, based on the total weight of all monomers (including, if present, a monomer to be described later which is an arbitrary component) contained in the photochromic curable composition from the viewpoint of the hardness of a cured product. Further, when a bifunctional monomer and a monomer having at least three functional groups are used in combination as the multifunctional monomer, the monomer having at least three functional groups is suitably used in an amount of 5 to 55 parts by weight, particularly suitably 10 to 30 parts by weight, based on 100 parts by weight of the bifunctional monomer, from the viewpoint of good balance between hardness and toughness (the balance can be said to be good when Rockwell hardness is 80 to 110).

To the photochromic curable composition of the present invention, a monofunctional polymerizable monomer (hereinafter also referred to as "monofunctional monomer") having no biphenyl skeleton may be added in such an amount that does not impair the effect of the present invention for the purpose of adjusting physical properties of a cured product which are required according to applications. The monofunctional polymerizable monomer having no biphenyl skeleton is used in an amount of preferably not larger than 30 parts by weight based on 100 parts by weight of the total of the polymerizable monomer having a biphenyl skeleton and a multifunctional polymerizable monomer having no biphenyl skeleton. Further, the amount of the monofunctional polymerizable monomer having no biphenyl skeleton is preferably not higher than 28% by weight, more preferably not higher than 25% by weight, based on the total weight of all monomers. As the monofunctional monomer, a known monofunctional monomer can be used. Illustrative examples of monofunctional monomers which can be added so as to adjust various physical properties when used as an optical plastic molded article include unsaturated carboxylic acids such as acrylic acid, methacrylic acid and maleic anhydride; acrylates and methacrylates such as methyl acrylate, methyl methacrylate, benzyl methacrylate, phenyl methacrylate, 2-hydroxyethyl methacrylate, glycidyl acrylate, glycidyl methacrylate, β-methylglycidyl methacrylate, bisphenol A monoglycidyl ether methacrylate, 4-glycidyloxy methacrylate, 3-(glycidyl-2-oxyethoxy)-2-hydroxypropyl methacrylate, 3-(glycidyloxy-1-isopropyloxy)-2-hydroxypropylacrylate, and 3-glycidyloxy-2-hydroxypropyloxy)-2-hydroxypropyl acrylate; fumarates such as diethyl fumarate and diphenyl fumarate; thioacrylates and thiomethacrylates such as methyl thioacrylate, benzyl thioacrylate and benzyl thiomethacrylate; and vinyl compounds such as styrene, chlorostyrene, methylstyrene, vinylnaphthalene, an α-methylstyrene dimer, and bromostyrene.

An organic photochromic compound to be used in the photochromic curable composition of the present invention refers to an organic dye having a function of developing color by light and losing color by light or heat, i.e., having photochromic properties. In the present invention, the organic photochromic compound is not particularly limited as long as it is a compound having such characteristics, and organic photochromic compounds such as chromene compounds, spirooxazine compounds and fulgimide compounds which are known to be able to be used as a raw material of a photochromic lens or optical switching can be used without limitations.

Illustrative examples of organic photochromic compounds which can be suitably used in the present invention include chromene compounds such as spiro[norbornane-2, 2'-[2H]benzo[h]chromene], spiro[bicyclo[3.3.1]nonane-9, 2'-[2H]benzo[h]chromene], 7'-methoxyspiro[bicyclo[3.3.1] nonane-9,2'-[2H]benzo[h]chromene], and 7'-methoxyspiro [norbornane-2,2'-[2H]benzo[h]chromene]; spirooxazine compounds such as 1'-methoxycarbonylmethyl-8''-methoxy-6''-(4-methylpiperadino)dispiro[cyclohexane-1,3'-(3H) indole-2'-(1'H),3''-(3H)naphtho(3,2-a)(1,4)oxazine], and 6'-fluoro-1',5'-dimethyl-6''-morpholinodispiro[cyclohexane-1,3'-(3H)indole-2'-(1'H),3''-(3H)naphtho(3,2-a)(1,4)oxazine]; and fulgimide compounds such as N-cyanomethyl-6,7-dihydro-2-(p-methoxyphenyl)-4-methylspiro(5,6-benzo [b]thiophenedicarboxyimide-7,2-tricyclo[3.3.1.1]decane), N-cyanomethyl-6,7-dihydro-4-methyl-2-phenylspiro(5,6-benzo[b]thiophenedicarboxyimide-7,2-tricyclo[3.3.1.1]decane), and 6,7-dihydro-4-methyl-2-(p-methylphenyl)-N-nitromethylspiro(5,6-benzo[b]thiophenedicarboxyimide-7,2-tricyclo[3.3.1.1]decane. Of these compounds, the chromene compound, particularly a high-molecular-weight chromene compound having a molecular weight of higher than 500 is known in that when it is dispersed in a polymer matrix, color development and color fading speeds are generally reduced as compared with when it is dispersed in a solution. When such a compound is used, the effect of the present invention is clearly exhibited.

The above organic photochromic compounds may be used alone or in admixture of two or more. In general, a plurality of organic photochromic compounds are compounded and used so as to obtain a developed color corresponding to application purposes. However, a chromene compound with a relatively slow color fading speed is particularly suitably used.

The content of the organic photochromic compound in the photochromic curable composition is not particularly limited. However, in consideration of the efficiency of color development of the organic photochromic compound, it is suitably 0.001 to 5 parts by weight, particularly suitably 0.005 to 0.5 parts by weight, based on 100 parts by weight of all monomers.

The photochromic curable composition of the present invention may contain a variety of additives in such an amount that does not impair the effect of the present invention. Illustrative examples of such additives include stabilizers and additives such as ultraviolet absorbers, ultraviolet stabilizers, antioxidants, coloration inhibitors and antistatic agents. Although the amounts of these additives vary depending on polymerization conditions, the type of initiator, the type and composition of organic photochromic compound to be used and the application purpose of a plastic molded article to be obtained and cannot be limited to particular amounts, they are suitably used in a total amount of 0.001 to 10 parts by weight based on 100 parts by weight of all monomers.

The photochromic curable composition of the present invention shows excellent photochromic properties and substrate properties when polymerized to form into a cured product. At this time, polymerization of the photochromic curable composition of the present invention can be carried out by addition of a polymerization initiator. As a polymerization method, photopolymerization, thermal radical polymerization or a combination of these can be used according to polymerization initiator to be used. When inhibition of the polymerization by dissolved oxygen is undesirable, deaeration is carried out first and then a polymerization initiator is added so as to start the polymerization. Further, when copolymerization is carried out by use of a plurality of polymerizable monomers, the copolymerization may be either block copolymerization or random copolymerization.

A thermal radical polymerization initiator when thermal radical polymerization is carried out is not particularly limited, and known thermal radical polymerization initiators can be used. Illustrative examples thereof include diacyl peroxides such as benzoyl peroxide, p-chlorbenzoyl peroxide, decanoyl peroxide, lauroyl peroxide, and acetyl peroxide; peroxy esters such as t-butylperoxy-2-ethyl hexanoate, t-butylperoxy dicarbonate, cumylperoxy neodecanoate, and t-butylperoxy benzoate; percarbonates such as diisopropylperoxy dicarbonate, di-2-ethylhexylperoxy dicarbonate, and di-sec-butylperoxy dicarbonate; and azo compounds such as azobisisobutyronitrile.

The amount of such a thermal radical polymerization initiator varies according to polymerization conditions, the type of the initiator, the types and compositions of polymerizable monomers to be used and cannot be limited to a particular amount. However, it is suitably used in an amount of 0.01 to 10 parts by weight based on 100 parts by weight of all polymerizable monomers.

Polymerization conditions for the thermal radical polymerization are not particularly limited, but a polymerization temperature influences the properties of a molded article to be obtained. A suitable polymerization temperature cannot be limited to a particular temperature because it is influenced by the type and amount of the polymerization initiator, the types and structures of polymerizable monomers to be used, and their compounding ratio and amounts. In general, it is desirably 30 to 100° C., more suitably 50 to 95° C., much more suitably 60 to 90° C.

Polymerization time also varies according to various factors. Hence, it is desirable to determine optimum time corresponding to these conditions in advance. It is generally 1 to 20 hours, more suitably 5 to 12 hours, much more suitably 7 to 10 hours.

Meanwhile, when photopolymerization is carried out, the photopolymerization is carried out by adding a photopolymerization initiator to the photochromic curable composition of the present invention and then irradiating the composition with an activation energy radiation.

The photopolymerization initiator is not particularly limited, and known photopolymerization initiators can be used. Illustrative examples of photopolymerization initiators which can be suitably used include acetophenone-based photopolymerization initiators such as 1-phenyl-2-hydroxy-2-methylpropane-1-one, 1-hydroxycyclohexylphenylketone and 1-(4-isopropylphenyl)-2-hydroxy-2-methylpropane-1-one; α-dicarbonyl photopolymerization initiators such as 1,2-diphenylethanedione and methylphenyl glyoxylate; and phosphine-oxide-based photopolymerization initiators such as 2,4,6-trimethylbenzoyldiphenylphospine oxide, bis(2,6-dimethoxybenzoyl)-2,4,4-trimethylpentylphosphine oxide, bis(2,6-dimethylbenzoyl)-2,4,4-trimethylpentylphosphine oxide, bis(2,4,6-trimethylbenzoyl)-2,4,4-trimethylpentylphosphine oxide, and bis(2,6-dichlorbenzoyl)-2,4,4-trimethylpentylphosphine oxide. These photopolymerization initiators may be used alone or in combination of two or more.

The amount of the photopolymerization initiator varies according to polymerization conditions, the type of the initiator, and the types and compositions of polymerizable monomers and cannot be limited to a particular amount. In general, it is suitably 0.005 to 3 parts by weight, preferably 0.02 to 1 part by weight, based on 100 parts by weight of all polymerizable monomers, from the viewpoints of the internal uniformity and degree of polymerization of the polymer.

When photopolymerization is carried out, a method of carrying out the polymerization by irradiation of activation energy radiation is not particularly limited, and a known polymerization method can be suitably employed. The activation energy radiation used in this case is an energy radiation having a wavelength of 200 to 500 nm. A light source of such an activation energy radiation is preferably those capable of emitting an ultraviolet radiation and a visible radiation. For example, a metal halide lamp, a low pressure mercury lamp, a high pressure mercury lamp, a super high pressure mercury lamp, a bactericidal lamp, a xenon lamp and the like are suitably used.

Irradiation time of the activation energy radiation for carrying out the polymerization varies according to the wavelength and strength of the light source and the shape and material of the polymer and cannot be uniquely determined but is generally 2 to 30 minutes. At this time, the temperature may be room temperature. Further, the polymerization may be carried out under an externally applied pressure.

Further, by use of a combination of the above thermal polymerization initiator and the above photopolymerization initiator, two-step polymerization may be carried out in which precuring is carried out by photopolymerization and then polymerization curing is completed by thermal polymerization through application of heat.

A cured product obtained by polymerizing and curing the photochromic curable composition of the present invention has high photochromic properties such as improvements in color development speed, color fading speed and developed color density and also has high mechanical properties and optical properties. Therefore, it can be suitably used as a photochromic lens.

EXAMPLES

Hereinafter, the present invention will be described in more detail with reference to Examples. However, the present invention shall not be limited to these Examples.

Example 1

To 100 parts by weight of monomer obtained by mixing 5 parts by weight of biphenyl monomer 1 (2-methacryloyloxybiphenyl, abbreviated as "2BiPh-MA") represented by the following formula (4) into 95 parts by weight of monomer mixture (hereinafter referred to as "main monomer") comprising 66 wt % of tetraethylene glycol dimethacrylate and 15 wt % of triethylene glycol dimethacrylate as bifunctional monomers and 9 wt % of glycidyl methacrylate, 2 wt % of hydroxyethyl methacrylate, 8 wt % of α-methylstyrene and 1 wt % of methylstyrene dimer as monofunctional monomers, 0.03 parts by weight of chromene compound (chromene 1) represented by the following formula (5) and 1 part by weight of perbutyl ND as a photopolymerization initiator were added and mixed sufficiently uniformly so as to prepare a photochromic curable composition of the present invention. The prepared composition was injected into a mold which was then put in an oven, and the temperature was increased to 90° C. in 18 hours and then kept at 90° C. for 2 hours so as to carry out polymerization. After completion of the polymerization, a 2-mm-thick disk-like plastic molded article was taken out of the mold. The molded article was further heat-treated at 100° C. for 2 hours.

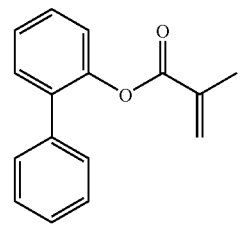

(4)

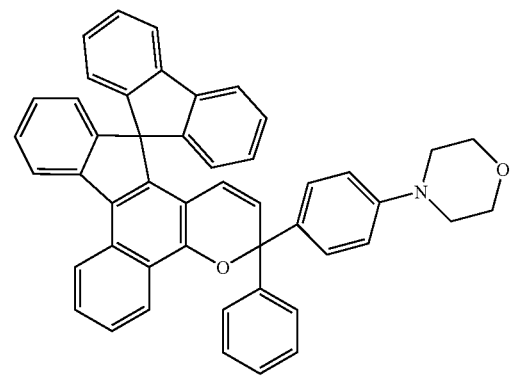

(5)

The resulting molded article was exposed to a xenon lamp (L-2480(300W)SHL-100, product of Hamamatsu Photonics Co., Ltd.) as excitation light via an aero mass filter at room temperature for 2 minutes so as to cause isomerization of a photochromic dye in the plastic molded article into an isomer having an absorption band in a visible range, i.e., cause the article to develop a color. The intensity of the excitation light at this time was 2.4 mW/cm$^2$ at a wavelength of 365 nm and 24 μW/cm$^2$ at a wavelength of 245 nm.

The absorption peak, absorption intensity and color fading half life of the color-developed plastic molded article were measured by means of a spectrophotometer (MCPD1000, product of Otsuka Denshi Kogyo Co., Ltd.). The intensity of a developed color was determined as a difference between a maximum color development value immediately after completion of irradiation of the excitation light and absorbance before excitation at the same wavelength. After the irradiation of the excitation light is stopped, the excited and color-developed photochromic plastic molded article gradually loses the color due to a reverse reaction and returns to an original colorless state. Thus, a color fading speed was evaluated by taking time required for the density of the developed color to be reduced to a half after the irradiation of the light was stopped as the color fading half life (it is needless to say that the higher the color fading speed, the shorter the color fading half life). To determine the color fading half life, an absorption spectrum at a moment was measured at all wavelengths in every unit of time by means of the above instantaneous multichannel photodiode array type spectrophotometer immediately after the irradiation of the excitation light was stopped, and time required for the absorption peak value immediately after excitement to be reduced to its half was taken as the color fading half life.

Further, the hardness of the plastic molded article was evaluated as L scale Rockwell hardness (HL). The measurement was made by use of a Rockwell hardness meter (AR-10, product of Akashi Co., Ltd.) after the 2-mm-thick photochromic plastic molded article was left to stand in a measurement room having an internal temperature of 25° C. for 1 day. The measurement was made three times and their average was taken as a measurement value.

The results of measurements of the obtained photochromic properties, hardnesses and the like are shown in Table 1.

TABLE 1

|  | Biphenyl Monomer/ Parts by Weight | TMPT/ Parts by Weight | Main Monomer/ Parts by Weight | Hardness | Color Fading Half Life/Minute | Developed Color Density/abs. | Absorption Peak/nm |
|---|---|---|---|---|---|---|---|
| Ex. 1 | 5 (Biphenyl Monomer 1) | 0 | 95 | 93.3 | 1.84 | 0.49 | 583 |
| Ex. 2 | 5 (Biphenyl Monomer 1) | 10 | 85 | 101.9 | 1.55 | 0.57 | 582 |
| Ex. 3 | 5 (Biphenyl Monomer 1) | 20 | 75 | 108 | 1.28 | 0.67 | 580 |
| Ex. 4 | 10 (Biphenyl Monomer 1) | 0 | 90 | 83.8 | 1.38 | 0.61 | 584 |
| Ex. 5 | 10 (Biphenyl Monomer 1) | 10 | 80 | 98.7 | 1.26 | 0.66 | 583 |
| Ex. 6 | 10 (Biphenyl Monomer 1) | 20 | 70 | 104 | 0.99 | 0.76 | 583 |
| Ex. 7 | 20 (Biphenyl Monomer 1) | 0 | 80 | 55.6 | 1.02 | 0.74 | 587 |
| Ex. 8 | 20 (Biphenyl Monomer 1) | 10 | 70 | 78.3 | 0.91 | 0.82 | 586 |
| Ex. 9 | 20 (Biphenyl Monomer 1) | 20 | 60 | 82.1 | 0.73 | 0.86 | 585 |
| Ex. 10 | 5 (Biphenyl Monomer 2) | 0 | 95 | 63.7 | 1.07 | 0.61 | 587 |
| Ex. 11 | 5 (Biphenyl Monomer 2) | 10 | 85 | 88.2 | 1.01 | 0.66 | 585 |
| Ex. 12 | 5 (Biphenyl Monomer 2) | 20 | 75 | 98.4 | 0.82 | 0.73 | 584 |
| Ex. 13 | 10 (Biphenyl Monomer 2) | 20 | 70 | 78.5 | 0.65 | 0.79 | 587 |
| Ex. 14 | 5 (Biphenyl Monomer 3) | 0 | 95 | 90.8 | 1.64 | 0.52 | 583 |
| Ex. 15 | 5 (Biphenyl Monomer 3) | 10 | 85 | 101.3 | 1.44 | 0.59 | 582 |
| Ex. 16 | 5 (Biphenyl Monomer 3) | 20 | 75 | 108.3 | 1.38 | 0.69 | 579 |
| Ex. 17 | 10 (Biphenyl Monomer 3) | 0 | 90 | 84 | 1.24 | 0.61 | 584 |
| Ex. 18 | 10 (Biphenyl Monomer 3) | 10 | 80 | 96.9 | 1.08 | 0.69 | 583 |
| Ex. 19 | 10 (Biphenyl Monomer 3) | 20 | 70 | 103.7 | 0.91 | 0.78 | 582 |
| Ex. 20 | 20 (Biphenyl Monomer 3) | 0 | 80 | 84.5 | 1.24 | 0.66 | 584 |
| Ex. 21 | 20 (Biphenyl Monomer 3) | 10 | 70 | 82.7 | 0.77 | 0.84 | 585 |
| Ex. 22 | 20 (Biphenyl Monomer 3) | 20 | 60 | 94.4 | 0.73 | 0.84 | 584 |
| Ex. 23 | 10 (Biphenyl Monomer 4) | 10 | 80 | 99.3 | 1.41 | 0.62 | 582 |
| Ex. 24 | 10 (Biphenyl Monomer 4) | 20 | 70 | 106 | 1.16 | 0.69 | 582 |
| Ex. 25 | 20 (Biphenyl Monomer 4) | 0 | 80 | 75.6 | 1.44 | 0.66 | 585 |
| Ex. 26 | 20 (Biphenyl Monomer 4) | 10 | 70 | 85.6 | 1.12 | 0.77 | 585 |
| Ex. 27 | 20 (Biphenyl Monomer 4) | 20 | 60 | 97.4 | 0.96 | 0.83 | 583 |
| Ex. 28 | 5 (Biphenyl Monomer 5) | 10 | 85 | 101.3 | 1.53 | 0.59 | 582 |
| Ex. 29 | 5 (Biphenyl Monomer 5) | 20 | 75 | 108.1 | 1.31 | 0.67 | 580 |
| Ex. 30 | 10 (Biphenyl Monomer 5) | 0 | 90 | 86 | 1.4 | 0.6 | 583 |
| Ex. 31 | 10 (Biphenyl Monomer 5) | 10 | 80 | 96.5 | 1.17 | 0.66 | 583 |
| Ex. 32 | 10 (Biphenyl Monomer 5) | 20 | 70 | 104.6 | 1.04 | 0.74 | 582 |
| Ex. 33 | 20 (Biphenyl Monomer 5) | 0 | 80 | 74.7 | 1.14 | 0.7 | 585 |
| Ex. 34 | 20 (Biphenyl Monomer 5) | 10 | 70 | 82.2 | 0.9 | 0.76 | 583 |
| Ex. 35 | 20 (Biphenyl Monomer 5) | 20 | 60 | 91.2 | 0.78 | 0.83 | 584 |

Ex.: Example

Examples 2 to 35

According to the compositions shown in Table 1, photochromic molded articles were obtained in the same manner as in Example 1. The results of measurements of the properties of these articles are also shown in Table 1.

In Table 1, TMPT stands for trimethylolpropane trimethacrylate used as a monomer having at least three functional groups, and the biphenyl monomers 2 to 5 represent the following compounds.-

Biphenyl Monomer 2: Compound represented by the following formula (6). This compound was obtained by Production Example 1 to be described later.

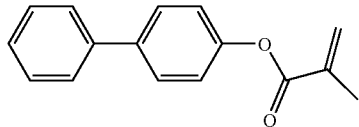
(6)

Biphenyl Monomer 3: Compound represented by the following formula (7).

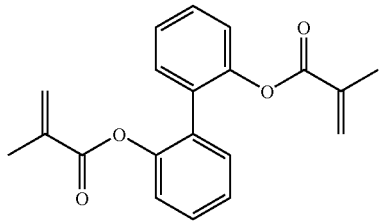
(7)

Biphenyl Monomer 4: Compound represented by the following formula (8).

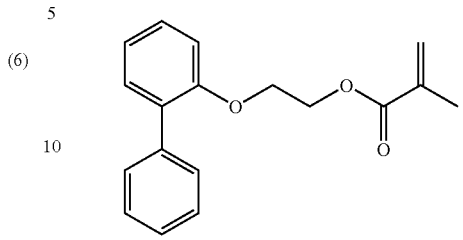
(8)

Biphenyl Monomer 5: Compound represented by the following formula (9).

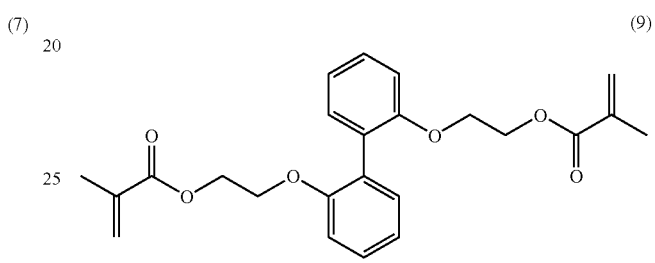
(9)

Biphenyl Monomer 6: Compound represented by the following formula (10).

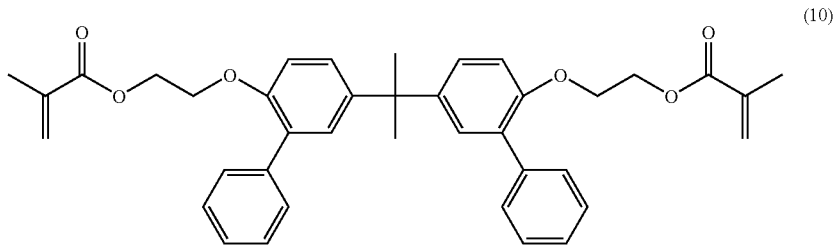
(10)

Biphenyl Monomer 7: Compound represented by the following formula (11).

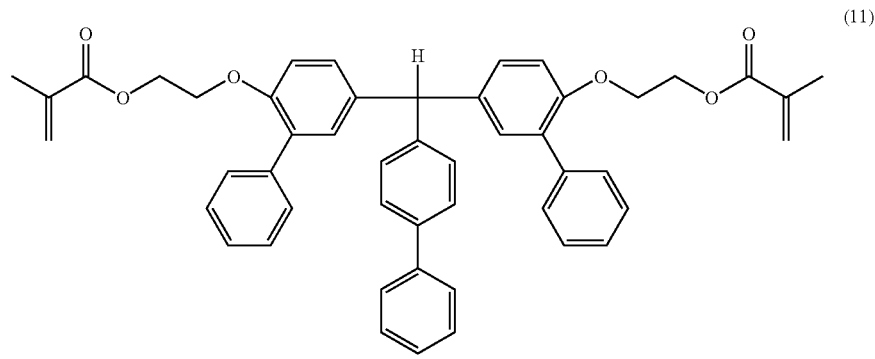
(11)

Biphenyl Monomer 8: Compound represented by the following formula (12).

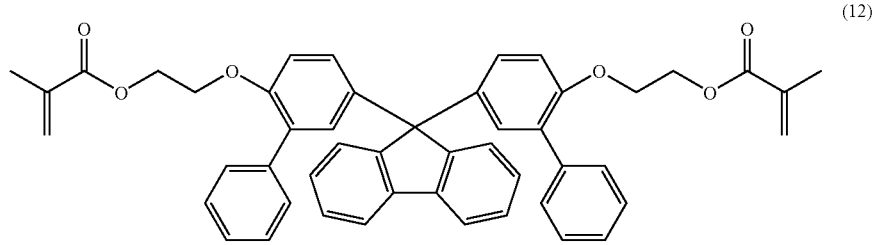

(12)

Further, when the refractive index and Abbe's number of the photochromic plastic molded article obtained in Example 12 were measured, the refractive index was 1.521 and the Abbe's number was 44.1. The Abbe's number was measured by use of an Abbe's refractometer (AR-S1, product of ATAGO CO., LTD.), and a refractive index in a sodium D line was measured at a temperature of the sample of 20° C. The measurement was made three times and their average was taken as a measurement value. At the same time, the Abbe's number was measured by use of the same apparatus. Conversion from a Z value was made in accordance with a conventional method.

Production Example 1

The biphenyl monomer 2 was produced in the following manner. Firstly, 50.5 g of 4-biphenol, 50 ml of triethylamine and 15 ml of pyridine were charged into a 300-ml three-neck flask and dissolved in 150 ml of dehydrated THF. On the flask, a nitrogen balloon, a thermometer, and a dropping funnel containing 49.7 g of methacrylic anhydride were mounted. With the flask disposed in an ice bath, methacrylic anhydride was added dropwise (for 1 hour) so as to keep the temperature at 10° C. or lower. After completion of the dropwise addition, the temperature was gradually increased to room temperature, and the mixture was stirred for 20 hours at room temperature.

After completion of the reaction, 50 ml of water was charged into the flask with the flask placed in an ice bath. Then, 100 ml of chloroform was added to the mixture which was then shaken, and an organic layer was separated by use of a separatory funnel. The organic layer was washed with a 3N HCl aqueous solution twice and with saturated NaCl aqueous solution once. Then, the organic layer was further washed with a saturated sodium bicarbonate aqueous solution once and again with saturated NaCl aqueous solution twice. After the solvent was distilled out from the organic layer, the resulting organic layer was recrystallized from ethanol. 55.3 g (77.4%) of colorless crystals were obtained.

As a result of $^1$H-NMR measurement, a 3H signal derived from a methacryl methyl group was observed at 2.06 ppm, a 1H signal derived from a double bond was observed at 5.73 ppm and 6.35 ppm, and a 9H signal derived from an aromatic proton was observed at 7.1 to 7.7 ppm, whereby synthesis was confirmed.

Comparative Examples 1 to 3

Photochromic molded articles were obtained by use of compositions having the compositions shown in Table 2 as examples using no biphenol monomers and an example using no biphenyl monomer and no TMPT and were evaluated in the same manner as in Example 1. The results are shown in Table 2.

TABLE 2

|  | Biphenyl Monomer/ Parts by Weight | TMPT/ Parts by Weight | Main Monomer/ Parts by Weight | Hardness | Color Fading Half Life/Minute | Developed Color Density/abs. | Absorption Peak/nm |
| --- | --- | --- | --- | --- | --- | --- | --- |
| C. Ex. 1 | 0 | 0 | 100 | 89.2 | 2.73 | 0.34 | 582 |
| C. Ex. 2 | 0 | 10 | 90 | 100 | 2.32 | 0.44 | 580 |
| C. Ex. 3 | 0 | 20 | 80 | 107 | 1.87 | 0.51 | 579 |
| C. Ex. 4 | 0 | 50 | 50 | 119 | 1.01 | 0.78 | 576 |

C. Ex.: Comparative Example

Comparative Example 4

A photochromic plastic molded article was obtained by use of a monomer mixture having the composition shown in Table 2 so as to attain a color fading half life and a developed color density which were comparable to those of Example 27, and the obtained molded article was evaluated. The results are shown in Table 2.

As shown in Table 2, a color fading speed and a developed color density can still be increased by adding only TMPT to a main monomer without using biphenyl monomers. In this case, however, the cured product becomes liable to be brittle (or hardness is liable to become too high) as the amount of TMPT to be added increases. Meanwhile, as shown in Table 1, when biphenyl monomers are used in combination with TMPT, larger color fading speed and developed color density improvement effects can be attained with the same amounts of TMPT. For example, when Example 1 or 17 is compared with Comparative Example 1, despite similar hardnesses, the color fading half life is from ¾ to ½ times or less, and the developed color density is from 4/3 to nearly 2 times, indicating that the photochromic properties were significantly improved. Further, when Example 12 and Comparative Example 1 which give almost the same hardness are compared with each other, the color fading speed of Example 12 is 2.7 times as high as that of Comparative Example 1, and the developed color density of Example 12 is at least 2 times as high as that of Comparative Example 1, indicating that addition of the biphenyl monomer has a significant effect. Further, the same holds true for Example 3 and Comparative Example 3. In addition, when Example 27 and Comparative Example 4 which have similar developed color densities and color fading half lives are compared with each other, the hardness of Comparative Example 4 is too high (toughness is lowered), thereby resulting in a brittle molded article. Thus, when a biphenyl monomer is used in combination with multifunctional monomers, a photochromic plastic molded article having a high color fading speed and a high developed color density can be obtained with the hardness of a substrate kept at a moderately high level.

Comparative Example 5

A plastic molded article was obtained in the same manner as in Example 12 except that a polyethylene glycol (PEG1540) having an average molecular weight of 1,540 was used in place of the biphenyl monomer so as to attain hardness and a color fading speed which were comparable to those of the molded article obtained in Example 12, and the obtained article was measured for photochromic properties, a refractive index and an Abbe's number. The photochromic properties are shown in Table 2. Further, the refractive index was 1.512, and the Abbe's number was 51.1.

As can be understood from comparison between Example 12 and Comparative Example 5 which was prepared so as to have the same hardness and color fading speed as those of Example 12, as compared with when the polyethylene glycol was added as an additive simply to reduce a crosslink density per unit weight, the developed color density and the refractive index are high when the biphenyl monomer was used in the same amount as that of the polyethylene glycol.

Examples 36 to 65

Photochromic plastic molded articles were obtained in the same manner as in Example 1 except that 0.02 parts by weight of compound (chromene 2) represented by the following formula (13) was used as an organic photochromic compound in place of 0.03 parts by weight of chromene 1 and that the compound was mixed with monomers having the compositions shown in Table 3, and the obtained articles were evaluated with respect to photochromic properties and lens properties. The results are shown in Table 3.

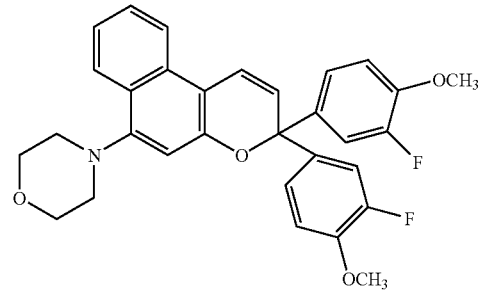

(13)

TABLE 3

|  | Biphenyl Monomer/ Parts by Weight | TMPT/ Parts by Weight | Main Monomer/ Parts by Weight | Hardness | Color Fading Half Life/Minute | Developed Color Density/abs. | Absorption Peak/nm |
| --- | --- | --- | --- | --- | --- | --- | --- |
| Ex. 36 | 10 (Biphenyl Monomer 1) | 0 | 90 | 80 | 1.71 | 1.1 | 443 |
| Ex. 37 | 10 (Biphenyl Monomer 1) | 10 | 80 | 95 | 1.7 | 1.1 | 443 |
| Ex. 38 | 10 (Biphenyl Monomer 1) | 20 | 70 | 103 | 1.63 | 1.18 | 442 |
| Ex. 39 | 20 (Biphenyl Monomer 1) | 0 | 80 | 63.7 | 1.59 | 1.17 | 445 |
| Ex. 40 | 20 (Biphenyl Monomer 1) | 10 | 70 | 75.6 | 1.43 | 1.18 | 445 |
| Ex. 41 | 20 (Biphenyl Monomer 1) | 20 | 60 | 81.6 | 1.38 | 1.32 | 445 |
| Ex. 42 | 5 (Biphenyl Monomer 2) | 0 | 95 | 80.7 | 1.89 | 1.08 | 443 |
| Ex. 43 | 5 (Biphenyl Monomer 2) | 10 | 85 | 86.9 | 1.58 | 1.17 | 443 |
| Ex. 44 | 5 (Biphenyl Monomer 2) | 20 | 75 | 103 | 1.65 | 1.22 | 443 |
| Ex. 45 | 10 (Biphenyl Monomer 2) | 0 | 90 | 67.4 | 1.59 | 1.19 | 444 |
| Ex. 46 | 10 (Biphenyl Monomer 2) | 10 | 80 | 76.3 | 1.42 | 1.24 | 445 |
| Ex. 47 | 10 (Biphenyl Monomer 2) | 20 | 70 | 89.9 | 1.4 | 1.32 | 444 |
| Ex. 48 | 10 (Biphenyl Monomer 3) | 0 | 90 | 80.7 | 1.64 | 1 | 442 |
| Ex. 49 | 10 (Biphenyl Monomer 3) | 10 | 80 | 96.9 | 1.61 | 1.04 | 443 |
| Ex. 50 | 10 (Biphenyl Monomer 3) | 20 | 70 | 104 | 1.56 | 1.14 | 442 |
| Ex. 51 | 20 (Biphenyl Monomer 3) | 0 | 80 | 70.8 | 1.45 | 1.16 | 445 |
| Ex. 52 | 20 (Biphenyl Monomer 3) | 10 | 70 | 79.9 | 1.37 | 1.21 | 446 |
| Ex. 53 | 20 (Biphenyl Monomer 3) | 20 | 60 | 92 | 1.39 | 1.26 | 446 |
| Ex. 54 | 10 (Biphenyl Monomer 4) | 0 | 90 | 88.3 | 1.97 | 0.96 | 443 |
| Ex. 55 | 10 (Biphenyl Monomer 4) | 10 | 80 | 99 | 1.81 | 1 | 442 |
| Ex. 56 | 10 (Biphenyl Monomer 4) | 20 | 70 | 105 | 1.65 | 1.1 | 441 |
| Ex. 57 | 20 (Biphenyl Monomer 4) | 0 | 80 | 72.6 | 1.68 | 1.06 | 443 |
| Ex. 58 | 20 (Biphenyl Monomer 4) | 10 | 70 | 85.4 | 1.59 | 1.18 | 443 |
| Ex. 59 | 20 (Biphenyl Monomer 4) | 20 | 60 | 95 | 1.49 | 1.21 | 442 |
| Ex. 60 | 10 (Biphenyl Monomer 5) | 0 | 90 | 83.9 | 1.78 | 0.99 | 442 |
| Ex. 61 | 10 (Biphenyl Monomer 5) | 10 | 80 | 95 | 1.65 | 1.02 | 442 |
| Ex. 62 | 10 (Biphenyl Monomer 5) | 20 | 70 | 102 | 1.53 | 1.11 | 442 |
| Ex. 63 | 20 (Biphenyl Monomer 5) | 0 | 80 | 69.1 | 1.62 | 1.14 | 444 |
| Ex. 64 | 20 (Biphenyl Monomer 5) | 10 | 70 | 81.2 | 1.51 | 1.17 | 444 |
| Ex. 65 | 20 (Biphenyl Monomer 5) | 20 | 60 | 88.3 | 1.47 | 1.27 | 444 |

Ex.: Example

Comparative Examples 6 to 9

Photochromic molded articles were obtained by use of compositions having the compositions shown in Table 4 as examples using no biphenyl monomers and an example using no biphenyl monomer and no TMPT when 0.02 parts by weight of chromene 2 was used, and the obtained molded articles were evaluated in the same manner as in Example 1. The results are shown in Table 4.

Examples 67 to 74

Photochromic plastic molded articles were obtained in the same manner as in Example 1 except that 0.04 parts by weight of compound (chromene 3) represented by the following formula (14) was used as an organic photochromic compound in place of 0.03 parts by weight of chromene 1 and that the compound was mixed with monomers having the compositions shown in Table 5, and the obtained molded articles were evaluated with respect to photochromic properties and lens properties. The results are shown in Table 5.

TABLE 4

| | Biphenyl Monomer/ Parts by Weight | TMPT/ Parts by Weight | Main Monomer/ Parts by Weight | Hardness | Color Fading Half Life/Minute | Developed Color Density/abs. | Absorption Peak/nm |
|---|---|---|---|---|---|---|---|
| C. Ex. 6 | 0 | 0 | 100 | 86.4 | 2.83 | 0.91 | 443 |
| C. Ex. 7 | 0 | 5 | 95 | 91.8 | 2.61 | 0.88 | 443 |
| C. Ex. 8 | 0 | 10 | 90 | 96.6 | 2.45 | 0.94 | 442 |
| C. Ex. 9 | 0 | 25 | 75 | 110 | 2.16 | 1.1 | 442 |
| C. Ex. 10 | 0 | 50 | 50 | 120 | 1.76 | 1.22 | 440 |

C. Ex.: Comparative Example

Comparative Example 10

A photochromic plastic molded article was obtained by use of a monomer mixture having the composition shown in Table 4 so as to attain a color fading half life and a developed color density which were comparable to those of Example 37, and the obtained molded article was evaluated. The results are shown in Table 4.

When Tables 3 and 4 are compared with each other, a tendency similar to that between Tables 1 and 2 is seen. Thus, it is understood that the effect of the present invention can still be obtained even if an organic photochromic compound to be used is changed from one to another.

Example 66

A photochromic plastic molded article was obtained in the same manner as in Example 6 except that 70 parts by weight of triethylene glycol dimethacrylate was used in place of 70 parts by weight of main monomer, and the obtained molded article was evaluated with respect to photochromic properties and lens properties. The molded article had a hardness of 109.2, a color fading half life of 1.32 minutes, and a developed color density of 0.64.

Comparative Example 11

A photochromic plastic molded article was obtained in the same manner as in Comparative Example 3 except that 80 parts by weight of triethylene glycol dimethacrylate was used in place of 80 parts by weight of main monomer, and the obtained molded article was evaluated with respect to photochromic properties and lens properties. The molded article had a hardness of 112.1, a color fading half life of 2.01 minutes, and a developed color density of 0.48.

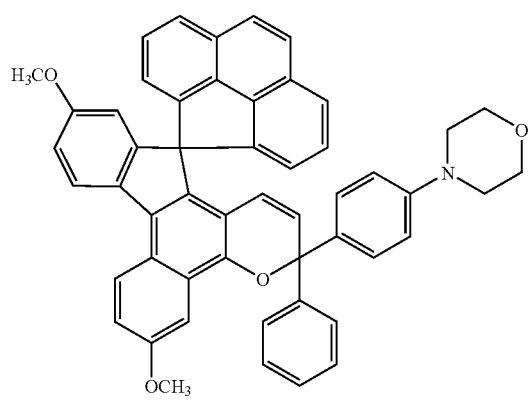

(14)

Comparative Example 12

As an example using no biphenyl monomer when 0.04 parts by weight of chromene 3 was used, a photochromic plastic molded article was obtained in the same manner as in Example 67 except that 90 parts by weight of main monomer and 10 parts by weight of TMPT were used, and the obtained molded article was evaluated with respect to photochromic properties and lens properties. The molded article had a hardness of 99, a color fading half life of 2.2 minutes, a developed color density of 0.86 and an absorption peak of 610 nm.

TABLE 5

|  | Biphenyl Monomer/ Parts by Weight | TMPT/ Parts by Weight | Main Monomer/ Parts by Weight | Hardness | Color Fading Half Life/Minute | Developed Color Density/abs. | Absorption Peak/nm |
|---|---|---|---|---|---|---|---|
| Ex. 67 | 10 (Biphenyl Monomer 1) | 10 | 80 | 98 | 1.14 | 0.88 | 612 |
| Ex. 68 | 10 (Biphenyl Monomer 2) | 10 | 80 | 76 | 1.03 | 0.96 | 612 |
| Ex. 69 | 10 (Biphenyl Monomer 3) | 10 | 80 | 97 | 0.98 | 0.93 | 610 |
| Ex. 70 | 10 (Biphenyl Monomer 4) | 10 | 80 | 99 | 1.22 | 0.91 | 612 |
| Ex. 71 | 10 (Biphenyl Monomer 5) | 10 | 80 | 97 | 1.07 | 0.94 | 610 |
| Ex. 72 | 10 (Biphenyl Monomer 6) | 10 | 80 | 98 | 1.05 | 0.92 | 610 |
| Ex. 73 | 10 (Biphenyl Monomer 7) | 10 | 80 | 96 | 1.00 | 0.90 | 612 |
| Ex. 74 | 10 (Biphenyl Monomer 8) | 10 | 80 | 94 | 0.98 | 0.89 | 610 |

Ex.: Example

As described above, heretofore, when an organic photochromic compound is dispersed in a polymer matrix, a developed color density and a color fading speed are lowered, and to suppress deteriorations in these physical properties, the mechanical and optical properties of the substrate cannot help being lowered. Meanwhile, a cured product obtained by curing the photochromic curable composition of the present invention has good mechanical and optical properties such as hardness, toughness and a refractive index of a substrate and a high developed color density and high color development and color fading speeds of an organic photochromic compound dispersed therein. Therefore, the curable composition of the present invention can be suitably used as a photochromic lens which requires a high developed color density and fast color development and color fading and also makes it possible to widely apply a photochromic material as an optically functioning material.

The invention claimed is:

1. A photochromic curable composition comprising a polymerizable monomer having a biphenyl skeleton, a multifunctional polymerizable monomer having no biphenyl skeleton, and an organic photochromic compound,
wherein the polymerizable monomer having a biphenyl skeleton is a polymerizable monomer in which one or two groups selected from the group consisting of an acryloyloxy group, a methacryloyloxy group, an acryloyloxyalkyloxy group and a methacryloyloxyalkyloxy group is/are directly bonded to the biphenyl skeleton.

2. The composition of claim 1, further comprising a monofunctional polymerizable monomer having no biphenyl skeleton.

3. A photochromic cured product obtained by curing the composition of claim 1 or 2.

4. The cured product of claim 3, having a Rockwell hardness of 80 to 110.

5. The composition of claim 1, wherein the polymerizable monomer having a biphenyl skeleton constitutes 2 to 80 parts by weight, the multifunctional polymerizable monomer having no biphenyl skeleton constitutes 20 to 98 parts by weight, and the organic photochromic compound constitutes 0.001 to 5 parts by weight, based on 100 parts by weight of the total of the polymerizable monomer having a biphenyl skeleton and the multifunctional polymerizable monomer having no biphenyl skeleton.

6. The composition of claim 2, wherein the content of the monofunctional polymerizable monomer having no biphenyl skeleton is 30 parts by weight or lower based on 100 parts by weight of the total of the polymerizable monomer having a biphenyl skeleton and the multifunctional polymerizable monomer having no biphenyl skeleton.

7. The composition of claim 1, wherein the multifunctional polymerizable monomer having no biphenyl skeleton is a mixture of a bifunctional polymerizable monomer having no biphenyl skeleton and a multifunctional polymerizable monomer having no biphenyl skeleton and at least three functional groups.

8. The composition of claim 1, wherein the organic photochromic compound is at least one compound selected from the group consisting of a chromene compound, a spirooxazine compound and a fulgimide compound.

9. The composition of claim 1, wherein the molecular weight of the organic photochromic compound exceeds 500.

* * * * *